Dec. 12, 1933.    W. O. FREYMANN    1,938,898
DISPLAY DEVICE
Filed June 6, 1932    4 Sheets-Sheet 2
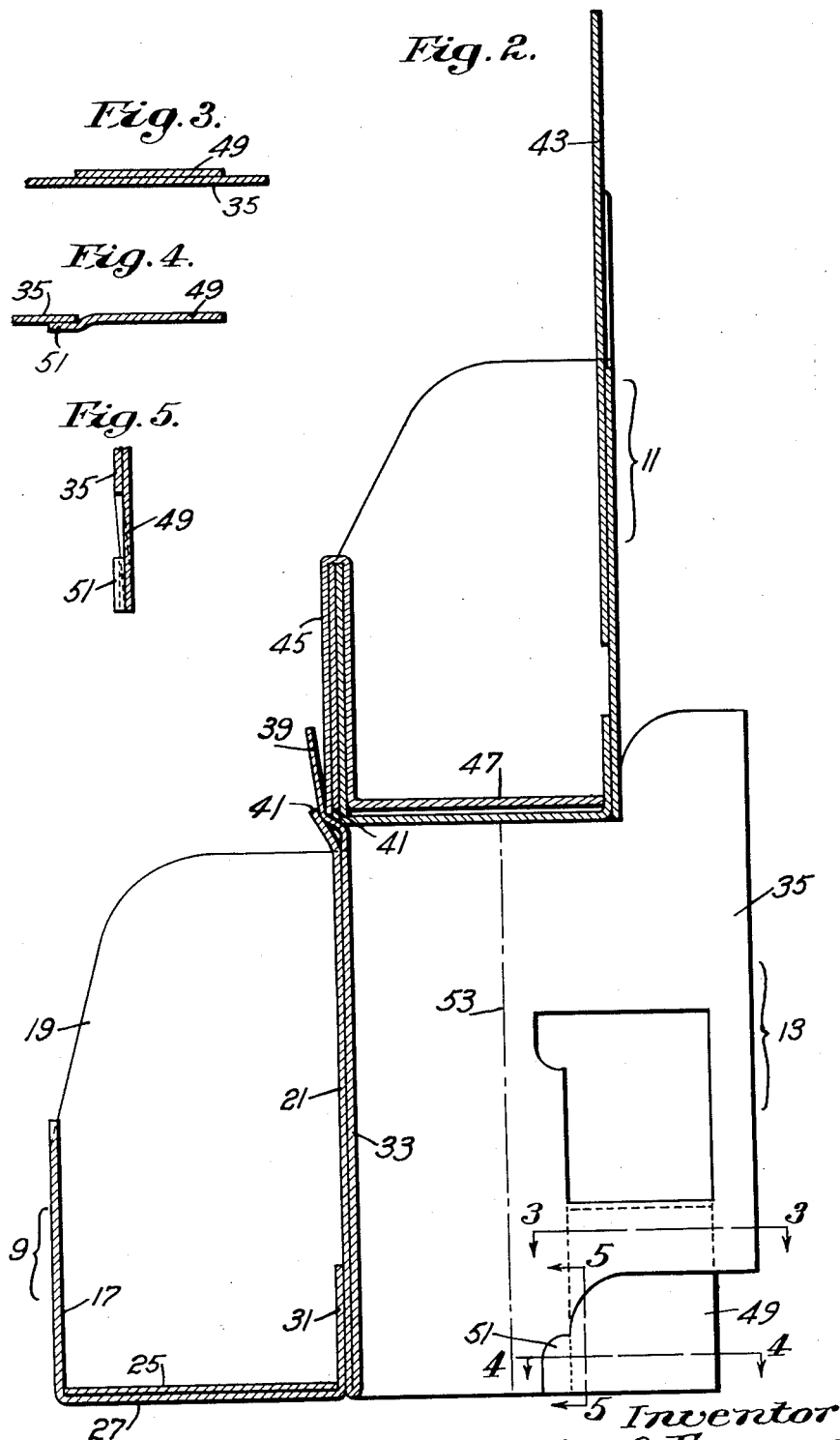

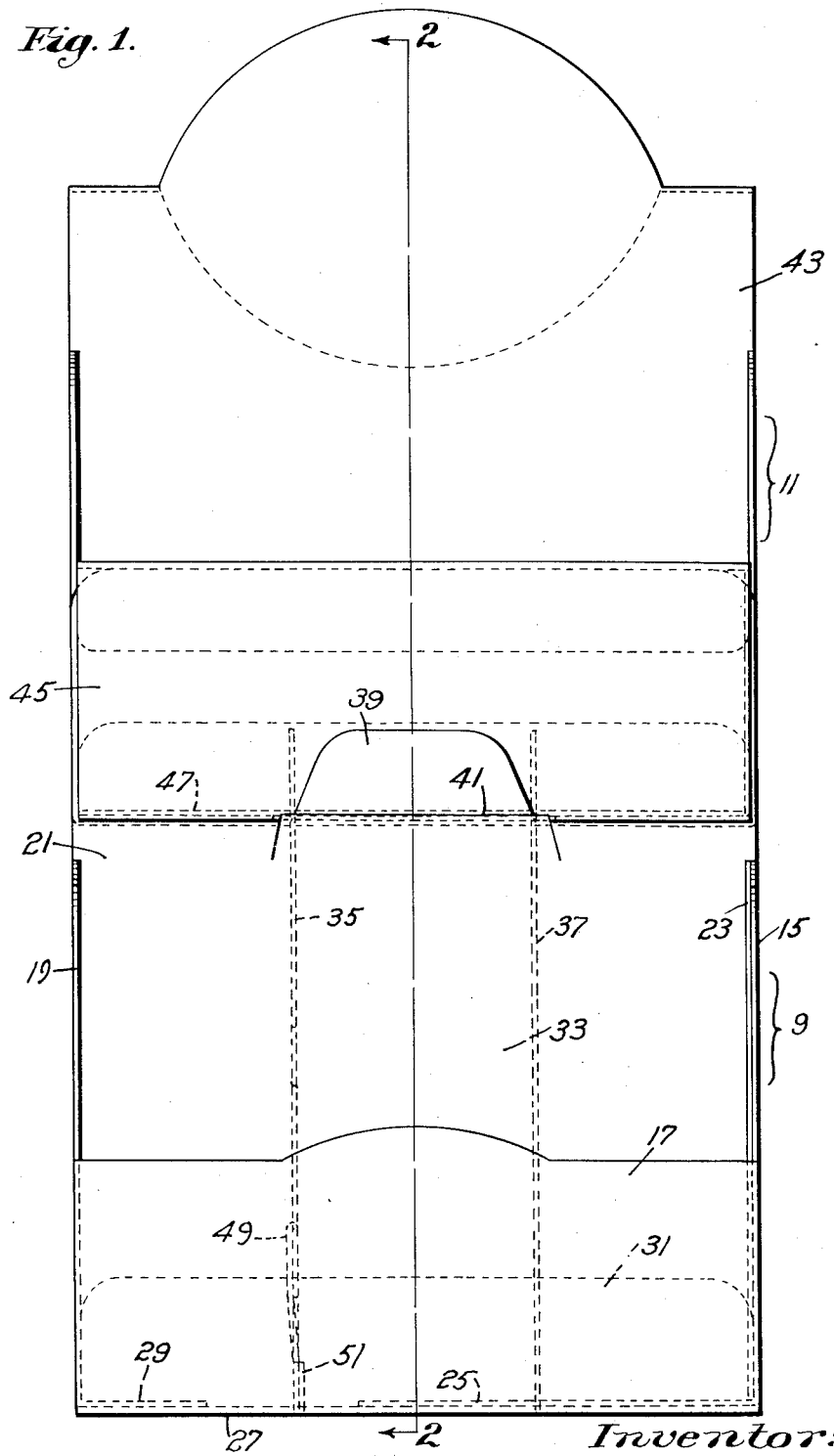

Dec. 12, 1933.  W. O. FREYMANN  1,938,898
DISPLAY DEVICE
Filed June 6, 1932  4 Sheets-Sheet 3
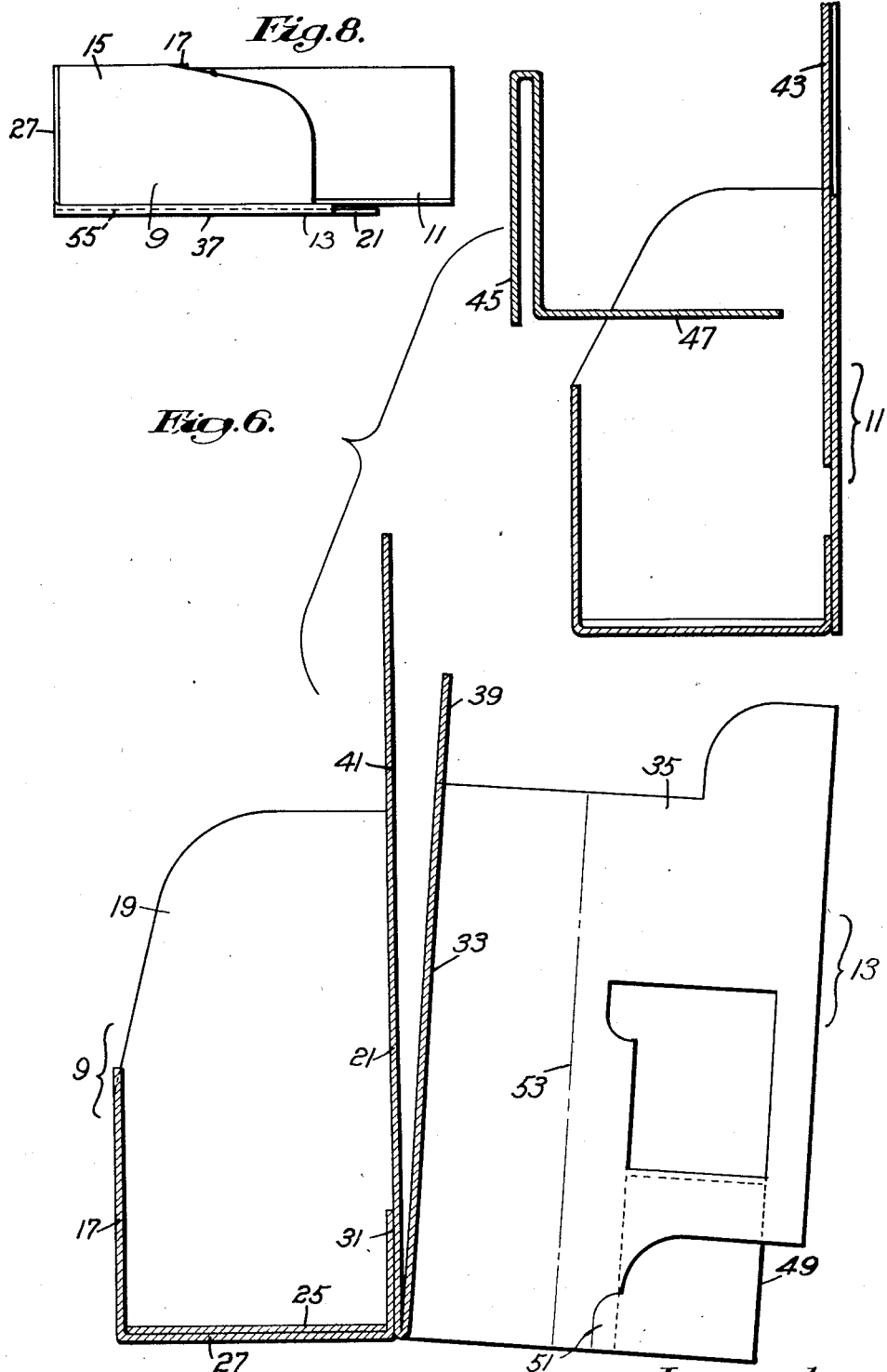
Inventor:
Walter O. Freymann.
by Emery, Booth, Varney Townsend Attys.

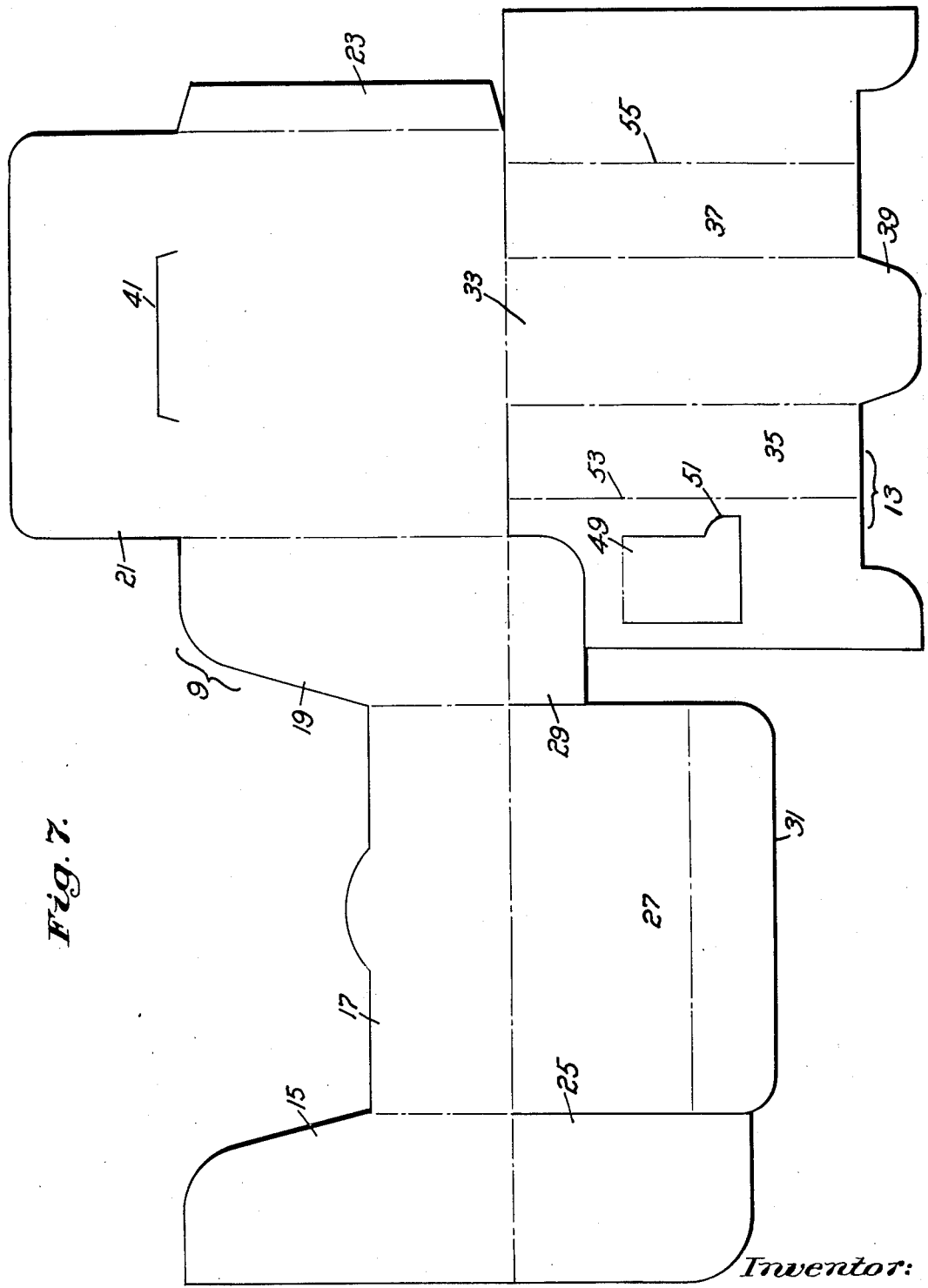

Patented Dec. 12, 1933

1,938,898

UNITED STATES PATENT OFFICE 1,938,898

DISPLAY DEVICE

Walter O. Freymann, Woodhaven, N. Y., assignor to Forbes Lithograph Manufacturing Company, Boston, Mass., a corporation of Massachusetts Application June 6, 1932. Serial No. 615,539

6 Claims. (Cl. 206—44)

This invention relates to display devices such, for example, as display boxes, and the object is to provide an improved construction permitting such devices to be more cheaply and efficaciously constructed. My invention finds a particular application to boxes of the type shown in the patent to Coombs 1,704,531, and by way of example I have herein illustrated such a type of box and will describe the features of my invention in connection therewith. The specific embodiment of the invention herein disclosed by way of illustration may therefore be considered an improvement on that box. An important feature of the invention is the provision of a construction whereby the operation of attachment by gluing of a supporting easel for holding the box in a display position when erected is dispensed with. To permit the general application of this improvement a feature of the invention is a novel easel or support finding a particular application to such boxes as will appear as the description proceeds.

My invention will be well understood by reference to the following description of the illustrative embodiment thereof shown by way of example in the accompanying drawings, wherein:—

Fig. 1 is a front elevation of the box in display position;

Fig. 2 is a central vertical section on the line 2—2 of Fig. 1;

Figs. 3, 4 and 5 are sections on the like numbered lines of Fig. 2 respectively;

Fig. 6 is a view similar to Fig. 2 but showing the various parts separated;

Fig. 7 is a plan view of the blank from which the lower box is made; and

Fig. 8 is a side elevation on a smaller scale showing the box in shipping position.

In the embodiment of my invention shown, as in the case of the Coombs patent, the container embodies a lower box 9 and an upper box 11 which may be folded together end to end for shipment, as seen in Fig. 8, or erected to the display position of Figs. 1 and 2, in which the upper box is supported behind the lower box to project above the same. This upper box 11 may be supported in that position by the easel 13 which also serves to maintain the front or lower box upright and which is designed to fold against the boxes in the collapsed position of Fig. 8.

The lower box 9 is preferably cut from a single sheet of cardboard stock and the easel 13 may be cut from the same sheet and be integral therewith, as will appear from the view of the blank in Fig. 7. The box there shown comprises a circuit of sides embodying side wall 15, front wall 17, side wall 19 and rear wall 21 which may be joined in circuit by the gluing flap 23 projecting from rear wall 21 and adapted to be secured to side 15. From the sides 15, 17 and 19 project the flaps 25, 27 and 29 respectively, which are adapted to be folded up to form the bottom, the flap 27 being provided with the tuck-in flap 31 to hold the parts in position. From the lower edge of the rear wall 21 projects the extension 33 foldably connected thereto and having projecting from opposite sides thereof the wings 35 and 37. This extension 33 may be doubled over on the fold line defined by the bottom edge of rear wall 21 in the manner seen in Figs. 6 and 2 and lie face to face against the same and the wings 35 and 37 may then be folded out at right angles to provide a supporting easel which in the present instance is similar in structure and function to the separately formed and attached easel disclosed in the Coombs patent above referred to. To retain the easel in this position the distal end of extension 33 may be provided with a tongue 39 which may be tucked through a slot 41 in the rear wall 21 of the box in the manner shown in Fig. 2. When the extension is so held in position the wings may be either folded flat towards the rear wall of the box or folded out to the erected position shown in Fig. 2. The top edges of the wings are notched to provide, when erected, a seat for supporting the upper box 11.

The upper box 11 may be formed from a circuit of sides having flaps which form the bottom, the rear wall being preferably arranged to double over in well known manner to form the display card 43. The upper box is herein hingedly connected to the lower box by means of an extension 45 from the upper edge of the front wall of said upper box, which extension engages over the rear wall of the lower box. Herein this extension 45 is shown as a part of a separate sheet which extends into the upper box and is provided with a flange 47 which underlies the goods in said box and is retained in position thereby. The sheet 45 may conveniently be engaged with the lower box by tucking in the lower edge of sheet 45 beneath tongue 39 where it projects through the rear wall 21 of the lower box.

In the example of the invention shown, the boxes 9 and 11 are of such depth that to provide the seats in the upper edges of the wings 35 and 37 to receive upper box 11 requires that the total width of the easel comprising the extension 33 and the two wings be greater than that of the back wall or panel 21. Referring now to Fig. 110

7, if we are to cut these parts from the same sheet of stock as contiguous areas thereof, no difficulty is encountered at the left hand side of the figure in providing the flap 25. The wing 35, however, projects beyond the right hand edge of the back panel or wall 21 in alignment with the side 19, and if the flap 29 is provided, it must be cut from a portion of the stock which would otherwise form the bottom edge of the wing 35. The difficulty is minimized by making flap 25 relatively long and flap 29 relatively short. However, as clearly seen from Fig. 7, a portion of the lower edge of wing 35 is cut away to provide flap 29. To provide ample bearing for the lower edge of the supporting wing 35 I may therefore cut from the body of this wing a tongue 49 which may be folded down, as best seen in Figs. 2, 3, 4 and 5, so that its lower edge is in alignment with the lower edge of wing 35 to provide a supporting foot at the location where this wing is cut away to provide flap 29. There is thus provided a bearing substantially as long as that which would be provided by the wing had it not been thus cut away. To secure this tongue in folded position it may be provided with the projecting tab 51 which is adapted to be engaged with the margin of the cut-away portion in the manner clearly illustrated in Figs. 3, 4 and 5.

Since the width of the parts which form the easel, the extension 33 and the wings 35 and 37, is greater than the width of the box to which it is attached, the wings 35 and 37 may be provided (see Fig. 8) with score lines 53 and 55 permitting them to be doubled over to be received within the contour of the box in the shipping position of the latter, as shown in Fig. 8.

I am aware that the invention may be embodied in other specific forms without departing from the spirit or essential attributes therof, and I therefore desire the present embodiment to be considered in all respects as illustrative and not restrictive; reference being had to the appended claims rather than to the foregoing description to indicate the scope of the invention.

I claim:

1. A display container of the class described comprising a lower box having an extension from the lower edge of the rear wall thereof, wings on the extension presenting a seat for a companion upper box, a tongue on the extension to pass through a slot in the said rear wall, and an upper box having a sheet extending from the upper edge of its front wall to overlie said rear wall of the lower box, the edge of said sheet being received beneath said tongue.

2. A display box having a collapsible easel extending from its lower rear edge having a distal tongue, the box having a slot to receive the tongue and a cooperating display card entering the box and having its lower edge received beneath said tongue which extends through the slot.

3. A box comprising a circuit of sides, flaps projecting from certain of the sides and folding together to form a bottom and a flap projecting from another side foldable to form an easel, a portion of said flap extending in the developed position of the parts beyond one of said other flaps, said easel having a tongue cut therefrom to fold to provide a support for said extending part.

4. A blank for a display structure in which the following parts are contiguously arranged on a single sheet of stock, to wit, a main panel, an auxiliary panel having a flap projecting therefrom, an easel comprising a main part contiguous to the said main panel and a folding wing in part complementary to said flap, said wing having a tongue cut therefrom to fold to provide a supporting foot for said wing at the location where stock is removed to provide the flap.

5. A display structure wherein the following parts are formed from a single sheet of stock, to wit, a main panel, an easel comprising a main part foldably attached to an edge of the main panel, a wing carried by the easel and extending in the developed position of the parts past the edge of said main panel, an auxiliary member carried by the main panel and having a portion extending past the fold line between the main panel and the main part of the easel and in at least partial alignment with the wing, the wing having a tongue cut therefrom to fold to provide a supporting foot for the wing at the location where stock is removed to provide the portion aforesaid.

6. In combination with a main part, a wing extending therefrom adapted to be turned at an angle thereto to support the same, the lower edge of the wing being cut away and a tongue cut from the wing to fold down to present a ground-engaging edge at the location of the cut-away portion, said tongue having means to interlock it with the margin of the wing at that location.

WALTER O. FREYMANN.